G. E. WHITNEY.
WEED EXTERMINATOR.
APPLICATION FILED JUNE 15, 1910.
981,508.
Patented Jan. 10, 1911.
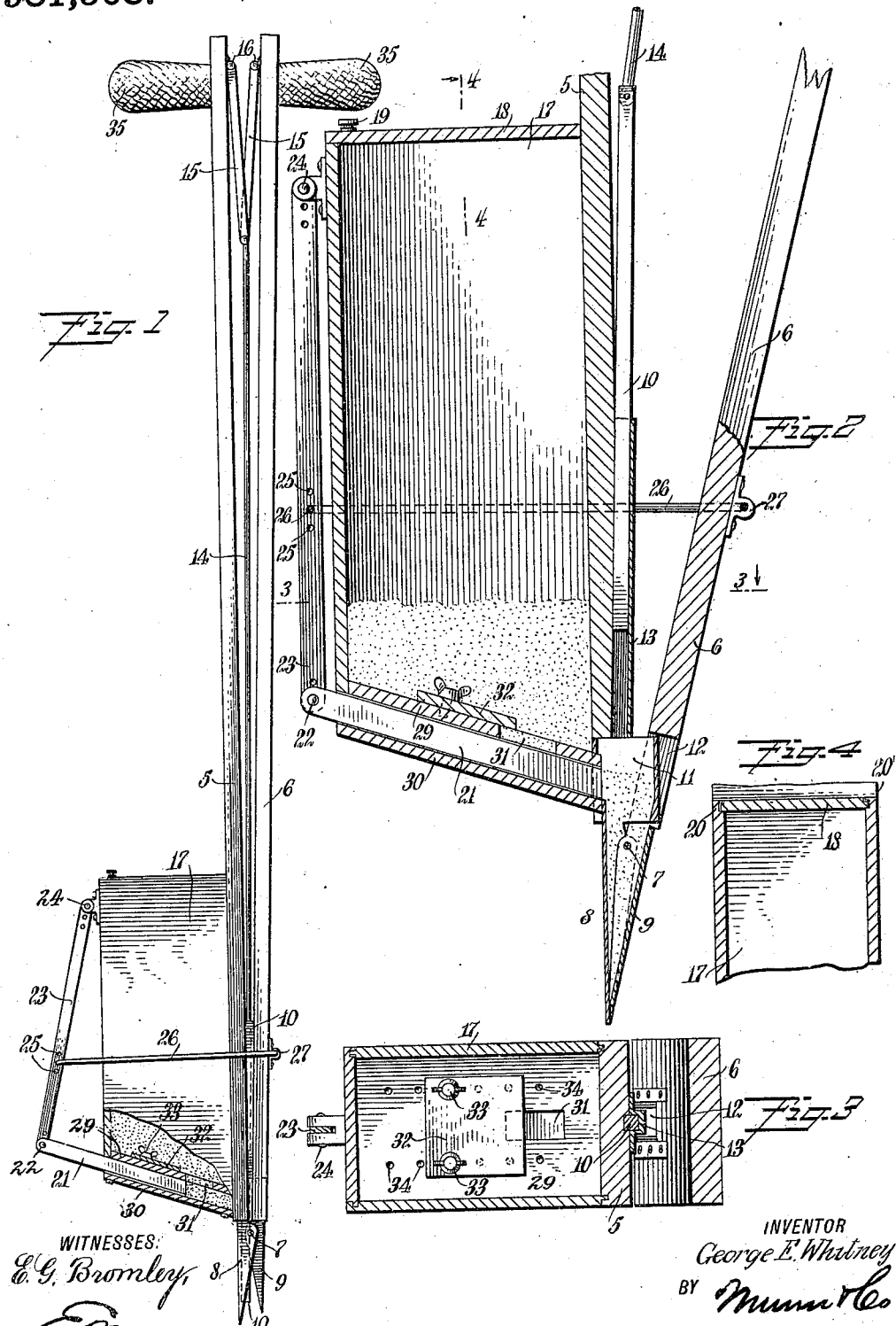
WITNESSES:
E. G. Bromley
E. A. Murdock
INVENTOR
George E. Whitney
BY Munn & Co.
ATTORNEYS

UNITED STATES PATENT OFFICE.

GEORGE EDSON WHITNEY, OF LANE, SOUTH DAKOTA.

WEED-EXTERMINATOR.

981,508.

Specification of Letters Patent.

Patented Jan. 10, 1911.

Application filed June 15, 1910. Serial No. 566,970.

*To all whom it may concern:*

Be it known that I, GEORGE E. WHITNEY, a citizen of the United States, and a resident of Lane, in the county of Jerauld and State of South Dakota, have invented a new and Improved Weed-Exterminator, of which the following is a full, clear, and exact description.

Among the principal objects which the present invention has in view are: to provide an apparatus, by the operation of which the heads or bodies of weeds may be pierced and have inserted therein lime or saliferous material of any suitable character fatal to the plant; to provide an apparatus for the purpose described to pierce and spread the body of a plant, and to inject in said body the eradicating material; to provide an apparatus of the character described with means whereby the quantity of eradicating material may be regulated and controlled; and to provide, for an apparatus of the character set forth, a construction which is simple, efficient and durable.

One embodiment of the present invention is disclosed in the structure illustrated in the accompanying drawings, in which like characters of reference denote corresponding parts in all the views, and in which—

Figure 1 is a side view of an apparatus constructed and arranged in accordance with the present invention; Fig. 2 is a detail view in vertical section and fragmentary in form, on an enlarged scale, showing the spear for piercing the plant and the reservoir for carrying the eradicating material; Fig. 3 is a longitudinal section taken on the line 3—3 in Fig. 2; and Fig. 4 is a vertical cross section taken on the line 4—4 in Fig. 2.

There are certain weeds, such as quack grass and dandelion, the roots whereof are fibrous and so numerous as to render the extermination of the plant a practical impossibility. It has been found, however, that certain materials, such as common salt, lime and materials of like nature and character, if introduced into the plant, or any portion thereof, will exterminate the same. It is acting upon this discovery that I have constructed the exterminator herein shown and described.

A spear is formed by me having two handle sections 5 and 6. The sections 5 and 6 are pivotally connected at 7, the pivot being driven through head sections 8 and 9. The sections 8 and 9 are hollow to provide a passageway for a plunger 10. When the handle sections 5 and 6 are separated to their fullest extent, the head sections 8 and 9 are joined, as shown in Fig. 2 of the drawings, to form a spear head. The head section 8 is longer than the head section 9, and the lower end thereof is provided with a cutting edge, as shown in said Fig. 2. The head sections 8 and 9 are rigidly connected to the handle sections 5 and 6. The section 8 is further provided with a guide extension 11, which extends through a squared perforation 12 formed in the handle section 6 above the pivot 7, to form an alinement guide for the operation of the handle sections. The extension 11 also forms a guide for the plunger 10. The plunger 10 is mounted in a runway 13, fixedly mounted on the back of the handle section 5, as shown in Fig. 2 of the drawings. The plunger 10 is pivotally connected to a pitman rod 14. The pitman rod 14 is pivotally connected to folding links 15, 15, which are pivotally connected at 16 to each of the handle sections 5 and 6. The links 15, 15 are so arranged that when the handle sections 5 and 6 are closed upon each other, as shown in Fig. 1 of the drawings, the links 15, 15 are extended at their pivotally connected ends. The extension of the links 15, 15 forces downward the rod 14, and with it the plunger 10 from the position shown in Fig. 2, through the runway 13 and between the head sections 8 and 9 to the position shown in Fig. 1 of the drawings.

The handle section 5 has permanently fixed thereon and attached to the side thereof a receptacle or reservoir 17. The receptacle 17 is constructed from any suitable material, and is provided with a sliding top 18, which is manipulated by a button handle 19 to slide in grooves 20, 20 formed at the upper edge of the said receptacle. The receptacle is intended to carry a supply of salt, lime or other eradicator. To deliver the eradicator from the receptacle there is provided a feed plunger 21. The feed plunger 21 is pivotally connected at 22 to a swinging bar 23. The swinging bar 23 is pivoted at 24 in brackets fixedly secured to the outer and narrow side of the receptacle 17.

The swinging bar 23 is provided with a series of perforations 25, 25, through which is passed a wire loop 26. The loop 26 surrounds the receptacle 17 and is passed through a perforation formed in a pivot plate 27 fixedly mounted on the handle section 6. The series of perforations 25, 25 are so arranged that the attachment of the loop 26 may be varied in the length of the swinging bar 23, thereby varying the amplitude of oscillation of the lower end of the said swinging bar and the length of reciprocation of the plunger 21 connected therewith.

The end of the plunger 21 in its extended position protrudes into the extension 11. It is thus extended when the head sections 8 and 9 are folded upon each other, and when thus folded form a pocket or receptacle to hold the material delivered through the receptacle 17 by the said plunger 21. It is to regulate and control the quantity of material thus delivered to the head sections 8 and 9 by the plunger 21 that I have provided the partition 29, separated from the bottom 30 of the receptacle to form a channel for the operation and guidance of the plunger 21. In the partition 29 I have formed an opening 31, through which the material contained in the receptacle is passed into the channel formed by the partition 29 and bottom 30. To govern the area of the opening 31 I have provided a sliding door 32. The door 32 is provided with wing nuts 33, 33, the threaded shanks whereof are extensible into perforations 34, 34 to be screwed therein. The perforations 34, 34 are arranged serially with reference to the movement of the door 32 to limit the opening 31. By adjusting the door 32 in the perforations 34 it is evident that the opening 31 may be reduced or completely closed.

The operation of a device constructed and arranged as herein shown is as follows: The operator handles the apparatus by means of hand holds 35 to force the spear head formed by the head sections 8 and 9 into the plant, or into the ground covered by the plant. In thus driving the spear into the plant or ground some portion of the plant must necessarily be severed and laid bare by the said spear head. The handle sections 5 and 6 have been held in their spread relation, and in such position of the handle sections 5 and 6 it will be noted that the links 15, 15 are drawn to approximately parallel position, lifting the rod 14 and plunger 10. Further, the plunger 21 has been advanced to deliver from the channel formed therefor into the receptacle formed by the head sections 8 and 9, a certain and assigned quantity of the eradicating material. The spear head having been sunk into the plant or ground, the handle sections 5 and 6 are drawn together to the position shown in Fig. 1 of the drawings. The head sections 8 and 9 have, by this action, been opened or swung upon the pivot 7, carrying thereunder the fabric of the plant through which the spear head has passed. Also, the links 15, 15 have been extended, carrying with them the rod 14 and the plunger 10, which in advancing forces downward and out the eradicating material which has been delivered by the plunger 21 into the receptacle formed by the head sections 8 and 9. It will also be noted that the plunger 10, in passing the orifices of the channel wherein is mounted the plunger 21, closes the said channel and prevents the further delivery of the material from the receptacle 17 until the said plunger is raised to the position shown in Fig. 2 of the drawings. The spear head having been opened with the result that the eradicating material has been deposited in position to exterminate the weed, the apparatus is raised with the handle sections 5 and 6 in the folded position shown in Fig 1 of the drawings. It will be remembered that the plunger 10 is in position to close the channel for the delivery of the eradicating material from the receptacle 17. When the next patch of weeds has been arrived at, the handle sections 5 and 6 are spread to close the head sections 8 and 9, which are again forced into the plant or surrounding earth.

It will be seen that in closing the head sections 8 and 9 as above mentioned, the plunger 21 has been carried forward to deliver the eradicating material which has been deposited through the opening 31, in the channel formed for the said plunger 21, the said material being deposited between the head sections 8 and 9 as above set forth.

If it is found that the quantity of material being delivered is too great or too small, this is remedied by moving the door 32 in accordance with the needs for greater or less quantity. Also, should it be found that the swing of the bar 23 is too great or too small, this is remedied by shifting the loop 26 to one of the perforations 25, 25 adapted to give the desired swing.

Having thus described my invention, what I claim as new and desire to secure by Letters Patent is:—

1. A weed exterminator, comprising a ground-piercing tool embodying a plurality of wedge-shaped sections hingedly connected at their upper ends; a receptacle for carrying a flowing weed-eradicating material, said receptacle having a side delivery opening to deliver into said wedge-shaped sections; a plunger guidably mounted in said wedge-shaped sections to eject the said eradicating material therefrom and to close the said side opening of said receptacle; a plurality of handle sections fixedly connected to said wedge-shaped sections; a plurality of links pivotally connected with said handle sections and with said plunger, said links being arranged to reciprocate said plunger as said handle sections are closed upon or separated from each other; a valve slide mounted in guides within said receptacle; a swinging arm pivotally mounted on said receptacle and operatively connected with said valve slide; and a connecting rod uniting said handle sections and said swinging arm, said rod being adjustable on said arm to vary the movement of said arm.

2. A weed exterminator, comprising a ground-piercing tool embodying a plurality of wedge-shaped sections hingedly connected at their upper ends; a receptacle for carrying a flowing weed-eradicating material, said receptacle having a side delivery opening to deliver into said wedge-shaped sections; a plunger guidably mounted in said wedge-shaped sections to eject the said eradicating material therefrom and to close the said side opening of said receptacle; a plurality of handle sections fixedly connected to said wedge-shaped sections; a plurality of links pivotally connected with said handle sections and with said plunger, said links being arranged to reciprocate said plunger as said handle sections are closed upon or separated from each other; a valve slide mounted in guides within said receptacle; a swinging arm pivotally mounted on said receptacle and operatively connected with said valve slide; a connecting rod uniting said handle sections and said swinging arm, said rod being adjustable on said arm to vary the movement of said arm; and a regulating device to limit the flow of said weed eradicating material from said receptacle.

In testimony whereof I have signed my name to this specification in the presence of two subscribing witnesses.

GEORGE EDSON WHITNEY.

Witnesses:
WALTER R. HUBBARD,
J. B. TILL.